(12) United States Patent
Fujisawa et al.

(10) Patent No.: US 6,439,537 B1
(45) Date of Patent: Aug. 27, 2002

(54) FORMING MOLD WITH RECESS HAVING SNAP-FIT END SEAL

(75) Inventors: Nobuo Fujisawa; Tsuyoshi Minato, both of Macon; Craig Jay Graham, Eastman, all of GA (US)

(73) Assignee: YKK Corporation of America, Marietta, GA (US)

( * ) Notice: Subject to any disclaimer, the term of this patent is extended or adjusted under 35 U.S.C. 154(b) by 31 days.

(21) Appl. No.: 09/664,601

(22) Filed: Sep. 18, 2000

(51) Int. Cl.[7] ............................................. B29C 39/10
(52) U.S. Cl. ...................... 249/85; 425/117; 425/127; 425/817 R
(58) Field of Search ................. 425/117, 127, 425/817 R; 249/83, 85

(56) References Cited

U.S. PATENT DOCUMENTS

| | | | |
|---|---|---|---|
| 3,353,220 A | * 11/1967 | Lenoble | 249/127 |
| 4,544,126 A | * 10/1985 | Melchert | 249/171 |
| 4,784,890 A | 11/1988 | Black | |
| 4,792,111 A | 12/1988 | Taguchi | |
| 5,500,268 A | 3/1996 | Billerant | |
| 5,614,045 A | 3/1997 | Billerant | |
| 5,654,070 A | 8/1997 | Billerant | |
| 5,665,449 A | 9/1997 | Billerant | |
| 5,766,723 A | 6/1998 | Oborny et al. | |
| 5,786,061 A | 7/1998 | Banfield | |
| 5,795,640 A | 8/1998 | Billerant | |
| 5,840,398 A | 11/1998 | Billerant | |
| 5,900,303 A | 5/1999 | Billerant | |

FOREIGN PATENT DOCUMENTS

JP       6-91662       4/1994

OTHER PUBLICATIONS

Abstract and translation of Japanese Publication No. 06–091662.*

* cited by examiner

Primary Examiner—Jan H. Silbaugh
Assistant Examiner—Donald Heckenberg
(74) Attorney, Agent, or Firm—John A. Galbreath

(57) ABSTRACT

The invention is a seat bun mold (10) with a recess (12) suitable for containing a fastener strip (18) to be molded into the seat bun, the recess (12) having an end wall (14) shaped so as to provide a snap-fit seal against the end of the fastener strip (18), in order to prevent fouling of the fastener strip (18) during the seat bun molding process. End wall (14) extends from the bottom to the top of the recess (12), and substantially curves inward along its lower extent and outward along its upper extent. The end of fastener strip (18) is snapped into recess (12) by first aligning fastener strip (18) over recess (12) and then exerting downward pressure. The tension of the end of fastener strip (18) against end wall (14) forms a seal to prevent intrusion of liquid molding material through end wall (14) of recess (12).

18 Claims, 7 Drawing Sheets

FORMING MOLD WITH RECESS HAVING SNAP-FIT END SEAL

CROSS-REFERENCES TO RELATED APPLICATIONS

Not applicable.

BACKGROUND

1. Field of the Invention

This invention is in the area of foam seat bun forming molds, specifically a forming mold with a fastener strip recess having specially-shaped end walls which provide a snap-fit seal against the ends of the fastener strip.

2. Description of the Related Art

Foam seat bun forming molds having recesses which accommodate a hook or loop fastener strip to be molded into the seat bun are known in the art, U.S. Pat. No. 4,792,111 to Taguchi being one example. Several different approaches have been taken in the art to the problem of liquid intruding into the ends of the mold recess during the initial molding process and fouling the hook or loop fastening elements. Most of these approaches involve incorporating end seal means into the fastener strip itself, as exemplified by the following:

U.S. Pat. Nos. 5,500,268; 5,614,045; and 5,654,070; all to Billerant, disclose a sealing strip of loops, similar to the loop material which engages hooks in a hook-and-loop fastener, which is placed as a barrier across each end of the fastener strip. U.S. Pat. No. 5,900,303 to Billerant uses molded plastic blocks as end barriers. U.S. Pat. No. 4,784,890 to Black discloses film which is attached to the ends of the fastener strip and which extends beyond the ends of the strip; or as an alternate barrier, dam-like structures which are placed onto the ends of the fastener strip. Perimeter seals, in which the end seals are an integral part of the overall seal around the outside borders of the fastener strip, are shown in U.S. Pat. Nos. 5,766,723 to Oborny et al. and 5,786,061 to Banfield.

All of the above methods, however, have a major disadvantage in that the end seal means are an additional component which must be incorporated into each fastener strip, thereby adding cost and complexity to the fastener strip manufacturing process. In addition, such fastener strips cannot be manufactured and supplied to seat bun makers in a long continuous spool, from which the necessary length of fastener strip can simply be cut during the seat bun molding process. Instead, these fastener strips must be precut to specific lengths, finished with end seals, and then supplied to the seat bun maker. It can be appreciated that this latter approach is inflexible and disadvantageous to the overall seat bun manufacturing process.

Alternate approaches to end-sealing the fastener strip have also been taken, and these involve sealing dams or ridges which are built into the forming mold. U.S. Pat. Nos. 5,665,449; 5,795,640; and 5,840,398; all to Billerant, illustrate examples of this alternate approach. These devices avoid the problem of having to incorporate end seals into each fastener strip; however, a major disadvantage of these devices is that they rely on magnetic or other hold-down means to force the fastener strip down onto the dam or ridge, in order to seal effectively during the molding process. If the magnetic or other hold-down force is weak or not positioned properly, these types of end seals will not seal effectively, and fouling of the fastening elements can occur.

Japanese Patent No. 6-91662 discloses a recess side wall with an inward bevel. However, this recess wall is differently-shaped than in applicant's device, and does not provide the advantages of applicant's specially-shaped walls. Specifically, the upper portion of the wall does not curve outward away from the interior of the recess, and thus does not form an entry bevel as in applicant's invention.

A beveled or curved fastener strip entry point provides a critical advantage, because it greatly facilitates snapping the fastener strip into place, by allowing the end of the fastener strip to "ride down" the entry bevel and then snap back into the lower portion of the mold wall. In addition, it greatly facilitates removing the fastener strip from the mold without tearing the fastener strip away from the finished seat bun, or otherwise damaging the bond between the fastener strip and the seat bun. The device of the Japanese patent does not have these important features or the advantages they convey, and is thus unsatisfactory.

Accordingly, several objects and advantages of the invention are:

The invention provides a means of end-sealing a mold-in fastener strip which does not have to be incorporated into each and every fastener strip, and which does not depend, in order to seal effectively, on the magnetic or other means used to hold down the strip.

Due to the specially-shaped end walls, and particularly the entry bevel, a fastener strip can be quickly and easily snapped into the mold recess of the invention, and the finished seat bun (with the in-molded fastener strip) can be easily withdrawn from the mold after molding is complete.

The invention can be used with many different types of fastener strips, and because the end seal means are incorporated right into the mold, the fastener strips can be made at a lower cost and with less manufacturing complexity. This allows the use of fastener strips which can be manufactured and supplied to seat bun makers in long continuous spools, rather than in precut pieces of specific and relatively short length.

The invention can be employed in forming various other items having in-molded fastener strips, not just foam seat buns.

Further objects and advantages of the invention will become apparent from a consideration of the drawings and ensuing description.

SUMMARY

The invention is a seat bun forming mold with a recess suitable for containing a fastener strip to be molded into the seat bun, the recess having end walls shaped so as to provide a snap-fit seal against the ends of the fastener strip, in order to prevent fouling of the fastener strip during the seat bun molding process.

DETAILED DESCRIPTION OF THE INVENTION

Figure 1:
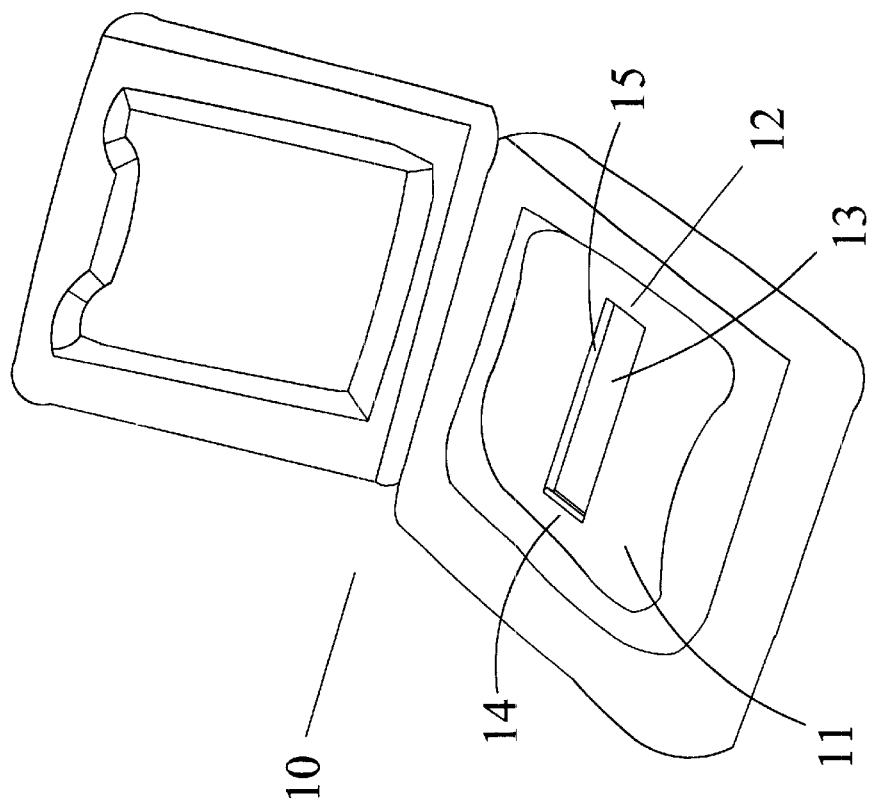
FIG. 1 is a perspective view of the forming mold, showing the elongated mold recess suitable for containing a fastener strip to be molded into the seat bun.

The following provides a list of the reference characters used in the drawings:
10. Forming mold
11. Cavity floor
12. Recess
13. Recess floor
14. End wall
15. Side wall
16. Entry bevel
17. Projection
18. Fastener strip
19. Hook element layer
20. Foam anchor
21. Indentation FIG. 1 provides an overall view of the invention:

A seat bun forming mold 10 has first and second portions which fit together to form a cavity with a cavity floor 11. An elongated recess 12, suitable for receiving a fastener strip 18 (not shown in this figure) to be molded into the seat bun while the seat bun is being formed, is located on the interior surface of the mold cavity.

Figure 2:
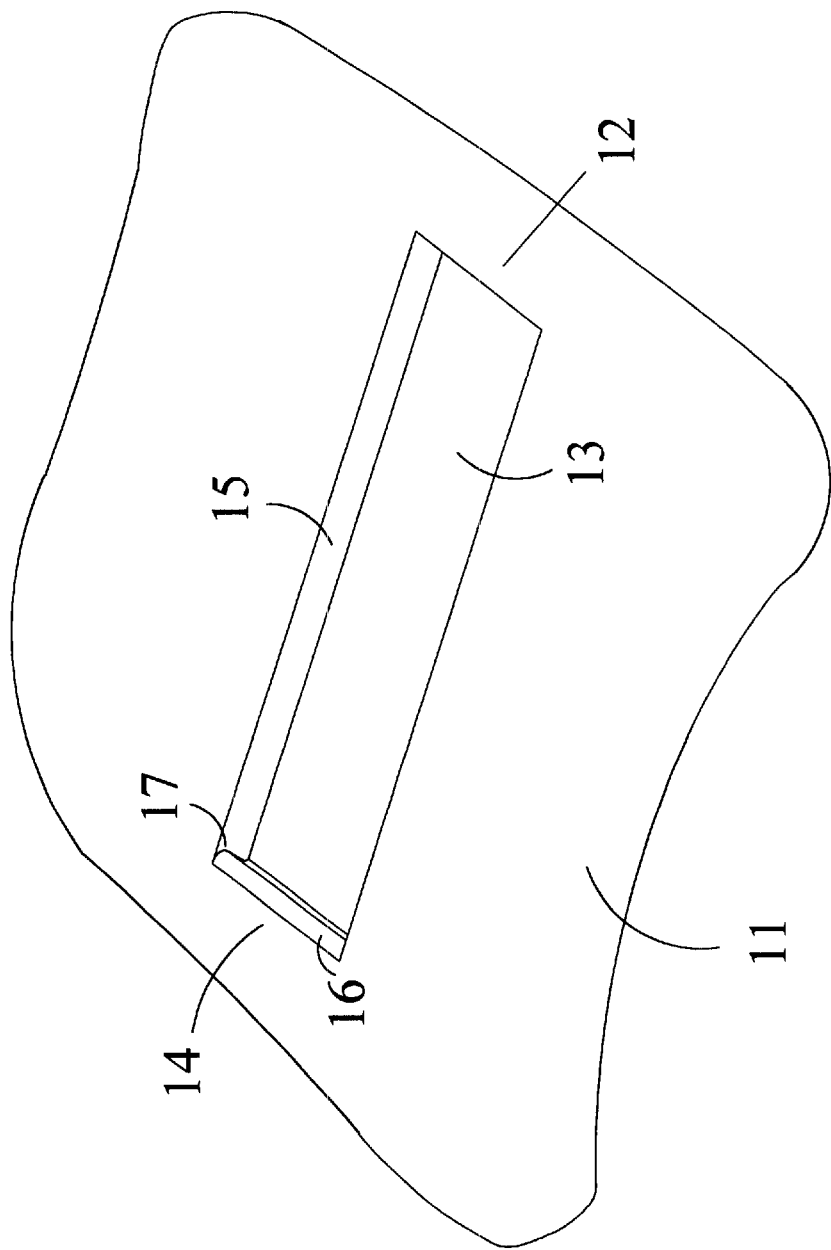
FIG. 2 is a detailed perspective view of the mold recess, illustrating its side wall and specially-shaped end wall.
Figure 3:
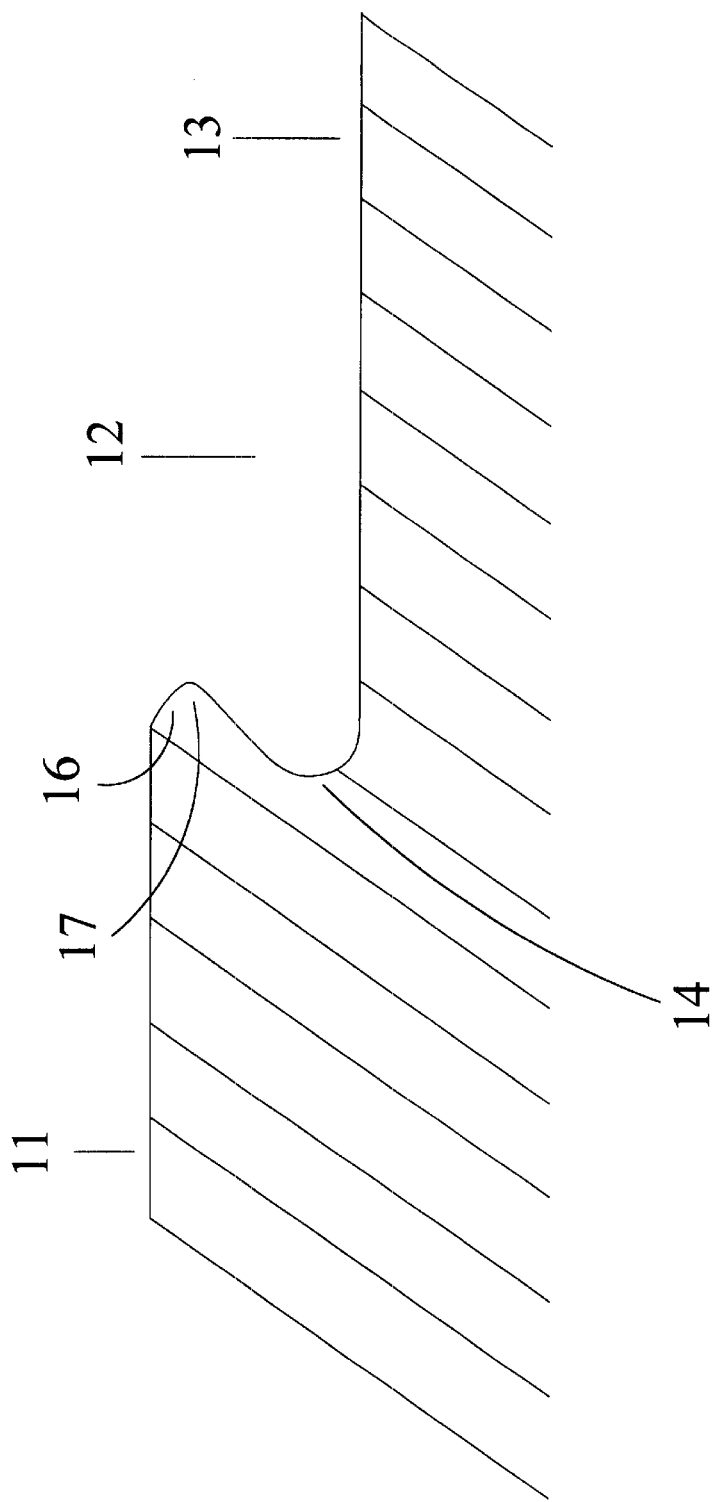
FIG. 3 is a side view of one end of the mold recess, cut away along the length of the recess, further illustrating the specially-shaped end wall.

FIGS. 2–5 detail the specific aspects of the invention:

As shown in FIG. 2, recess 12 has a recess floor 13, an end wall 14, and a side wall 15. Side wall 15 is substantially flat and substantially perpendicular to recess floor 13. As detailed in FIG. 3, end wall 14 extends from recess floor 13 to cavity floor 11, and substantially curves inward, along its lower extent, toward the interior of recess 12. End wall 14 has an entry bevel 16, located on the upper portion of end wall 14. Entry bevel 16 curves outward, away from the interior of recess 12, such that entry bevel 16 and the lower portion of end wall 14 together form a projection 17.

Figure 4:
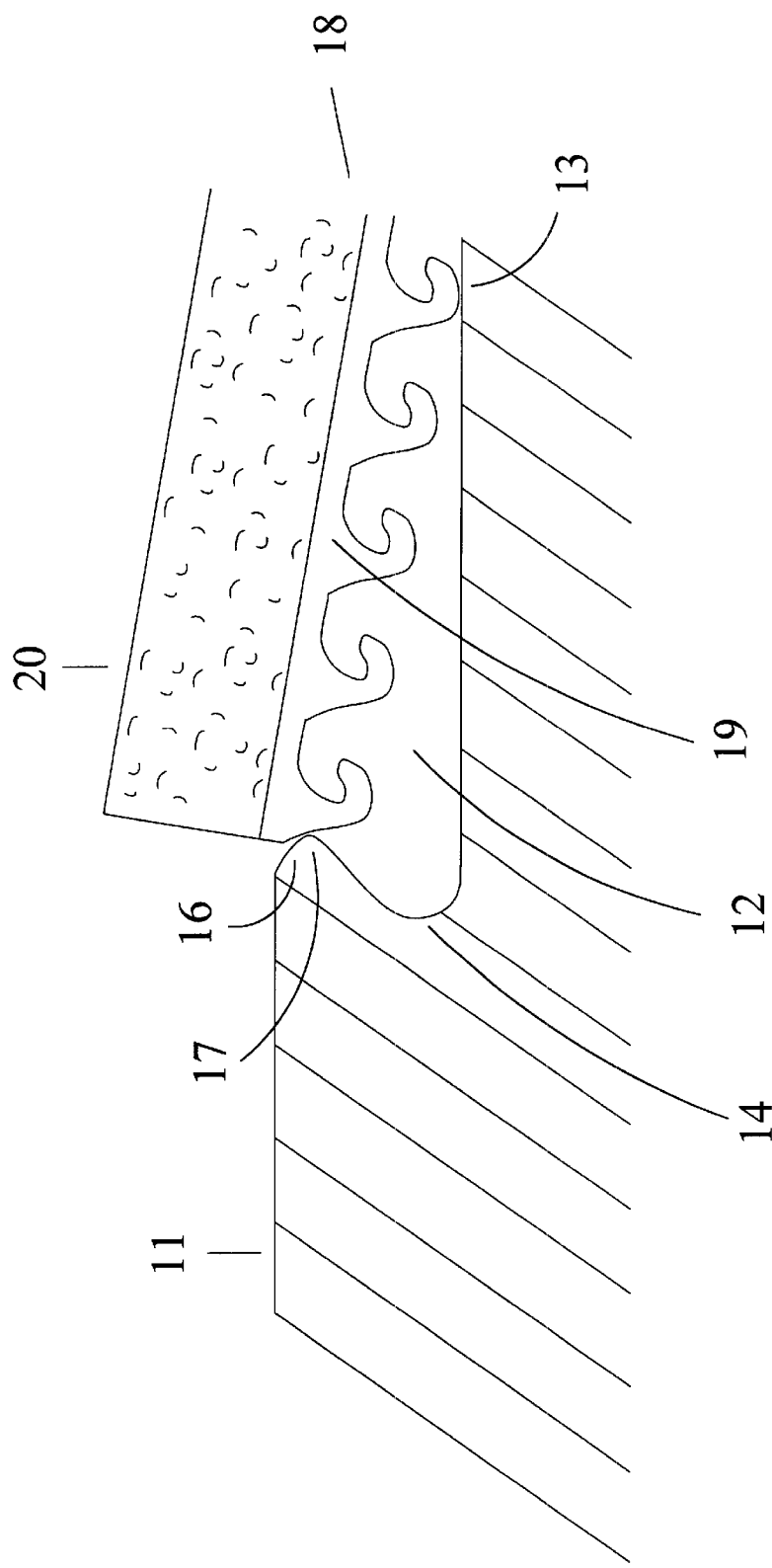
FIG. 4 is a cutaway side view, showing a fastener strip in the process of being snapped into the end wall of the mold recess.

FIG. 4 illustrates the end of a suitable fastener strip 18, in the process of being snapped into end wall 14 of recess 12. Fastener strip 18 comprises a hook element layer 19 and a foam anchor 20 affixed to the non-fastening side of hook element layer 19. As shown, the end of fastener strip 18 is snapped into recess 12 by first aligning fastener strip 18 over recess 12. Downward pressure is then exerted on the end of fastener strip 18, thereby urging the end of fastener strip 18 downward along entry bevel 16 until the end of fastener strip 18 reaches that point of projection 17 which extends farthest into the interior of recess 12.

Figure 5:
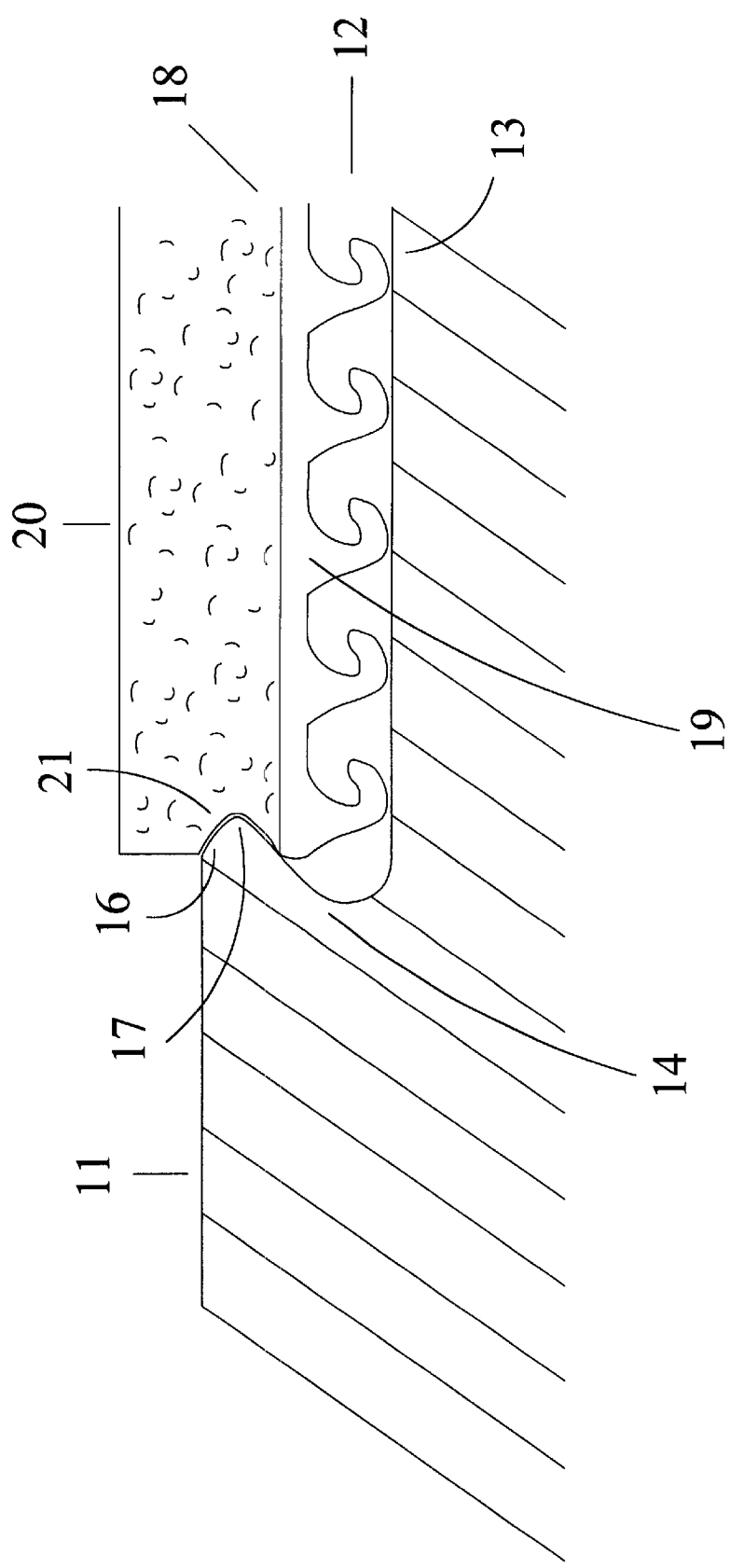
FIG. 5 is a cutaway side view, showing the end wall of the mold recess fully engaged with a fastener strip.

As shown in FIG. 5, further downward pressure causes the end of fastener strip 18 to spring back along the lower portion of end wall 14, such that the end of fastener strip 18 seats into, and is retained by, end wall 14. The tension of the end of hook element layer 19 against end wall 14 forms a seal to prevent intrusion of liquid molding material through end wall 14 of recess 12. In addition, projection 17 forms an indentation 21 in foam anchor 20, further sealing end wall 14 against liquid intrusion.

Figure 6:
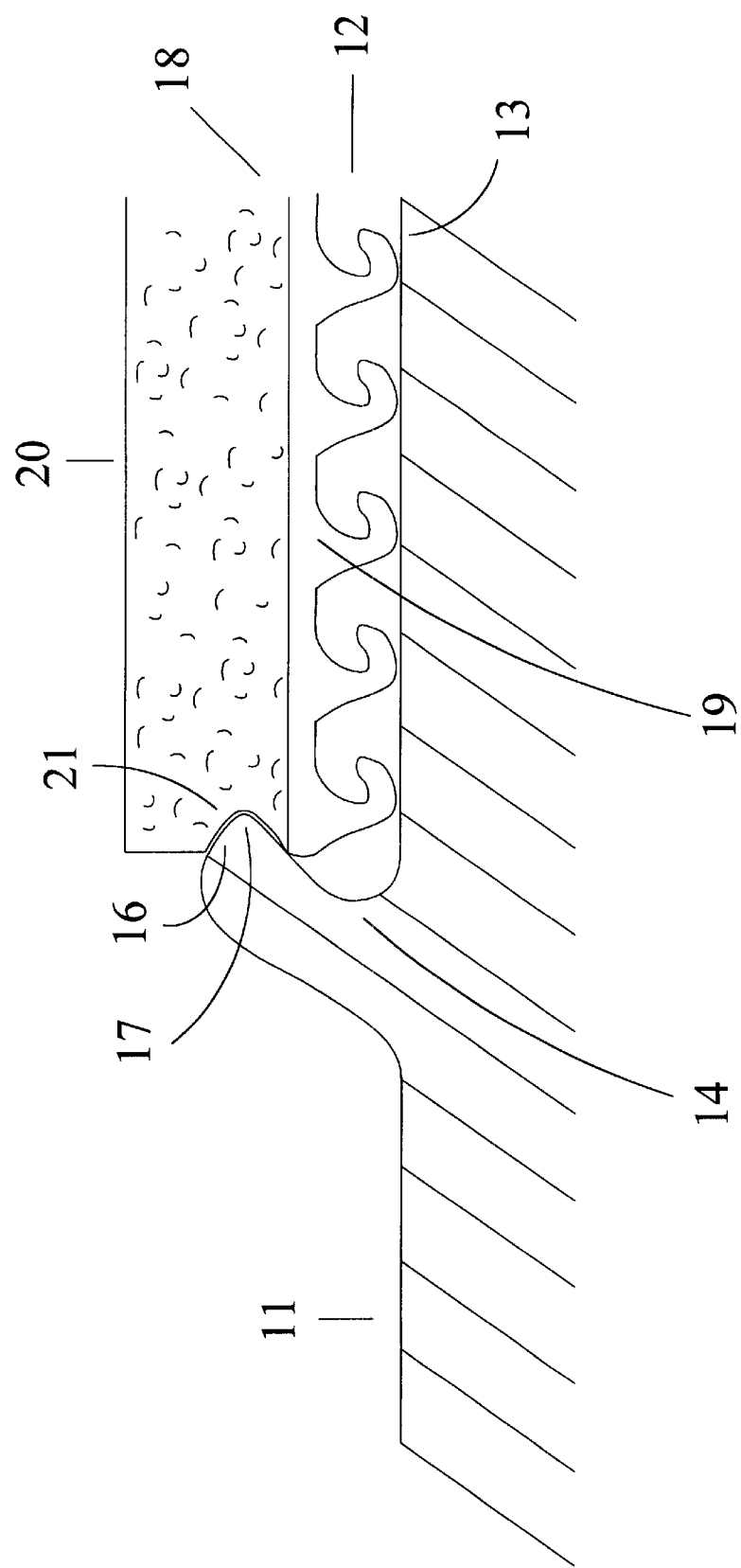
FIG. 6 is a cutaway side view of an alternative embodiment, wherein the shaped end wall of the mold recess protrudes above the "floor" of the mold cavity.

FIG. 6 illustrates an alternative embodiment, wherein the top of end wall 14 protrudes above cavity floor 11. Unlike the main embodiment, in which recess floor 13 is below the level of cavity floor 11, in this alternative embodiment recess floor 13 is substantially even with the level of cavity floor 11, such that end wall 14 protrudes above cavity floor 11. It can be appreciated that this allows fastener strip 18 to be inset deeper into the foam bun as it is being formed. Other parts, and other operating steps, are the same as in the main embodiment.

Figure 7:
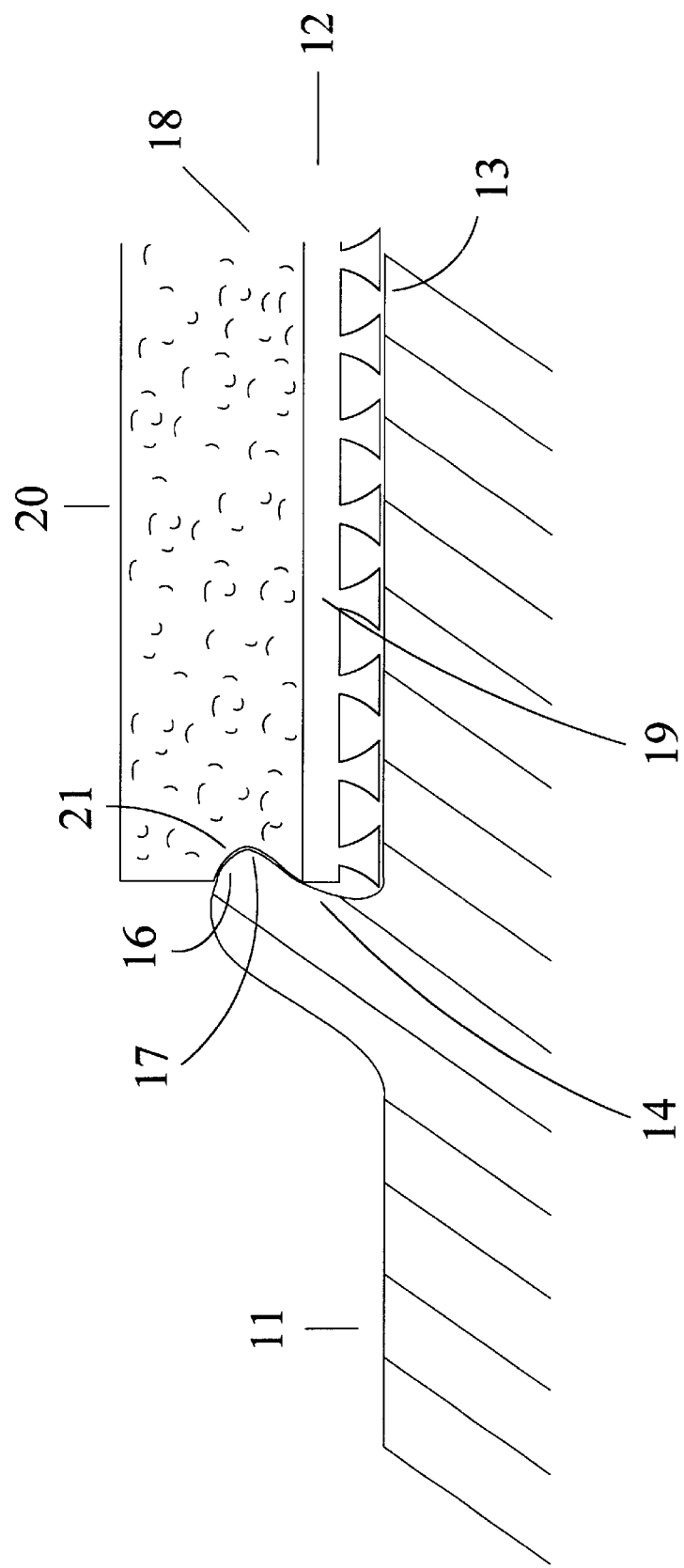
FIG. 7 is a cutaway side view of an alternative embodiment, wherein the end wall of the mold recess is differently shaped, so as to seal against a fastener strip having shorter hooks.

FIG. 7 illustrates an alternative embodiment, wherein end wall 14 of recess 12 is differently shaped, so as to seal against a fastener strip having shorter hooks than in the main embodiment. In this alternative embodiment, end wall 14 curves inward at a lower point than in the main and FIG. 6 embodiments, in order to seal properly against a hook element layer 19 having shorter hooks. End wall 14 thus protrudes above cavity floor 11, and recess floor 13, to a lesser extent than in the FIG. 6 embodiment.

It should be understood that while just one end, and one side, of recess 12 are described above and shown in accompanying FIGS. 2–7, recess 12 has, of course, two ends and two sides. The end wall at the opposite end of recess 12, like the end wall 14 illustrated in the figures, is shaped to form a seal with fastener strip 18 against liquid intrusion. Therefore, when snapping the ends of fastener strip 18 into the ends of recess 12, downward pressure may be simultaneously exerted on both ends of fastener strip 18; or alternatively, one end of fastener strip 18 may be first positioned into one end of recess 12, with the other end of fastener strip 18 then being snapped into recess 12.

Conclusions, Ramifications, and Scope:

Thus the reader will see that this invention provides a very convenient and effective way of sealing the ends of an in-molded fastener strip against fouling during the molding process, without the higher cost and greater complexity associated with placing end sealing means on the fastener strip itself.

While the above descriptions contain many specificities, these shall not be construed as limitations on the scope of the invention, but rather as exemplifications of embodiments thereof. Many other variations are possible. Examples of just a few of the possible variations follow:

It can be appreciated that varying the shape of the end wall—for instance, the degree of the lower portion's inward curvature, the degree of the upper portion's outward curvature (the slope of the entry bevel), and the degree of projection into the interior of the recess—will result in varying degrees of ease-of-entry of the fastener strip into the recess and varying degrees of retention of the fastener strip within the recess. All that is required is that the end walls be suitably shaped to: allow a fastener strip of the appropriate length and stiffness to be easily snapped into the recess, seal effectively against fouling, and allow the finished seat bun (with the in-molded fastener strip) to be easily withdrawn from the mold after molding is complete.

Within the above parameters, the recess end walls can have various other shapes. For example, the end walls can be beveled more sharply and angularly, rather than being gently curved as in the embodiments shown. As another example, the end wall can have a lower, "flatter" profile, similar to that shown in the FIG. 7 embodiment, or a higher, less flat profile.

In addition, the mold recess floor can be higher, lower, or at the same level as the mold cavity floor, in order to inset a fastener strip into the seat bun to varying degrees or to accommodate fastener strips having various hook heights.

The side wall, although shown here as substantially flat and substantially perpendicular to the mold recess floor, can have other non-flat and non-perpendicular shapes.

Further, the snap-in end seal embodied in the invention can be used with fastener strips of many varying. types and constructions, not just the foam anchor fastener strips shown in the main and alternative embodiments. For example, the unique snap-in recess end walls could easily be used with a fastener strip having loop fastening elements, and not hooks. As another example, fastener strips having projection anchor systems (not just porous anchor systems, as in the main embodiment) would also be compatible with the invention. The fastener strip can also have ends which are designed to correspond to the shaped end wall of the mold recess—e.g., beveled or notched—in contrast to the "straight-cut" ends shown in the main and alternative embodiments.

Finally, of course, the forming mold of the invention can be used for forming various other items having in-molded fastener strips, not just a foam seat bun as described herein.

Accordingly, the scope of the invention should be determined not by the embodiments illustrated, but by the appended claims and their legal equivalents.

What is claimed is:

1. A mold for forming an object, comprising:
   (a) a mold cavity, and
   (b) a recess located on a surface of said mold cavity, said recess having at least one end and suitable for receiving a fastening assembly having at least one end, and
   (c) an end wall located at one said end of said recess below the uppermost point of said recess, said end wall having a projection thereon in order to frictionally engage and seal one said end of said fastening assembly against fouling during a forming process, said projection being defined by one portion of the surface of said end wall extending inward toward the interior of said recess and another portion of the surface of said end wall extending outward away from the interior of said recess.

2. The device of claim 1, wherein said recess has a floor which is inset below said surface of said mold cavity.

3. The device of claim 1, wherein said recess has a floor which is substantially level with said surface of said mold cavity, and said end wall protrudes above said surface of said mold cavity.

4. The device of claim 1, wherein said end wall has an upper portion, and said upper portion of said end wall has a bevel located thereon in order to facilitate entry of said fastening assembly into said recess.

5. A mold for forming an object, comprising:
   (a) a mold cavity,
   (b) a recess located on a surface of said mold cavity, said recess having at least one end and suitable for receiving a fastening assembly having at least one end,
   (c) an end wall located at one said end of said recess below the uppermost point of said recess, said end wall having a projection thereon in order to receive and retain one said end of said fastening assembly in a snap-fit relationship, said projection being defined by one portion of the surface of said end wall extending inward toward the interior of said recess and another portion of the surface of said end wall extending outward away from the interior of said recess.

6. The device of claim 5, wherein said recess has a floor which is inset below said surface of said mold cavity.

7. The device of claim 5, wherein said recess has a floor which is substantially level with said surface of said mold cavity, and said end wall protrudes above said surface of said mold cavity.

8. The device of claim 5, wherein said end wall has an upper portion, and said upper portion of said end wall has a bevel located thereon in order to facilitate entry of said fastening assembly into said recess.

9. A mold for forming an object, comprising:
   (a) a mold cavity,
   (b) a recess located on a surface of said mold cavity, said recess having a floor and at least one end and suitable for receiving a fastening assembly having at least one end,
   (c) a side wall located along the length of said recess, said side wall being substantially perpendicular to said floor,
   (d) an end wall substantially shorter than said side wall and located at one said end of said recess, said end wall having a projection thereon in order to frictionally engage and seal one said end of said fastening assembly against fouling during a forming process.

10. The device of claim 9, wherein said end wall has an upper and a lower portion, and said projection is defined by said lower portion of said end wall extending inward toward the interior of said recess and said upper portion of said end wall extending outward away from the interior of said recess.

11. The device of claim 9, wherein said floor is inset below said surface of said mold cavity.

12. The device of claim 9, wherein said floor is substantially level with said surface of said mold cavity, and said end wall protrudes above said surface of said mold cavity.

13. The device of claim 9, wherein said end wall has an upper portion, and said upper portion of said end wall has a bevel located thereon in order to facilitate entry of said fastening assembly into said recess.

14. A mold for forming an object, comprising:
   (a) a mold cavity, and
   (b) a recess located on a surface of said mold cavity, said recess having at least one end and suitable for receiving a fastening assembly having at least one end, and
   (c) an end wall located at one said end of said recess, said end wall having an arcuate shape in order to receive and retain one said end of said fastener assembly, thereby sealing said end of said fastening assembly against fouling during a forming process.

15. The device of claim 14, wherein said end wall has an upper and a lower portion, and said lower portion of said end wall curves inward toward the interior of said recess, and said upper portion of said end wall curves outward away from the interior of said recess, such that said upper and lower portions of said end wall together form a projection into the interior of said recess.

16. The device of claim 14, wherein said recess has a floor which is inset below said surface of said mold cavity.

17. The device of claim 14, wherein said recess has a floor which is substantially level with said surface of said mold cavity, and said end wall protrudes above said surface of said mold cavity.

18. The device of claim 14, wherein said end wall has an upper portion, and said upper portion of said end wall has a bevel located thereon in order to facilitate entry of said fastening assembly into said recess.

* * * * *